United States Patent [19]
Frank et al.

[11]  4,238,873
[45]  Dec. 16, 1980

[54] APPARATUS FOR COLLECTING AND TRANSPORTING HEAT ENERGY

[75] Inventors: Matthew W. Frank; Donald E. Oberbeck, both of Boulder, Colo.

[73] Assignee: Entropy Limited, Boulder, Colo.

[21] Appl. No.: 885,501

[22] Filed: Mar. 13, 1978

[51] Int. Cl.³ .............................................. F24J 3/02
[52] U.S. Cl. .................................. 126/443; 126/438; 126/433
[58] Field of Search ................. 126/433, 443, 434, 438

[56] References Cited

U.S. PATENT DOCUMENTS

| | | | |
|---|---|---|---|
| 1,705,988 | 3/1929 | Maxwell | 126/433 |
| 3,875,926 | 4/1975 | Frank | 126/271 |
| 4,027,653 | 6/1977 | Meckler | 126/271 |
| 4,067,314 | 6/1978 | Bollefer | 126/271 |

Primary Examiner—Samuel Scott
Assistant Examiner—George Anderson
Attorney, Agent, or Firm—Frank C. Lowe; H. B. Van Valkenburgh

[57] ABSTRACT

The invention is an apparatus for collecting and transporting thermal energy as vaporized fluid. The vapor will flow from a heat absorption chamber and through a conduit to a point of use where it is condensed. The heat absorption chamber includes a sump in its lower portion to hold a puddle of fluid. A heat source directed against the chamber vaporizes the fluid therewithin and a replacement fluid supply connects with the chamber to maintain the level of the puddle during vaporization. The chamber of the preferred embodiment of the invention is an elongated heat absorption pipe mounted horizontally to maintain the puddle at the lower portion of the pipe. The heat absorption pipe is mounted in a solar collector to receive concentrated solar energy as from a reflector system.

13 Claims, 15 Drawing Figures

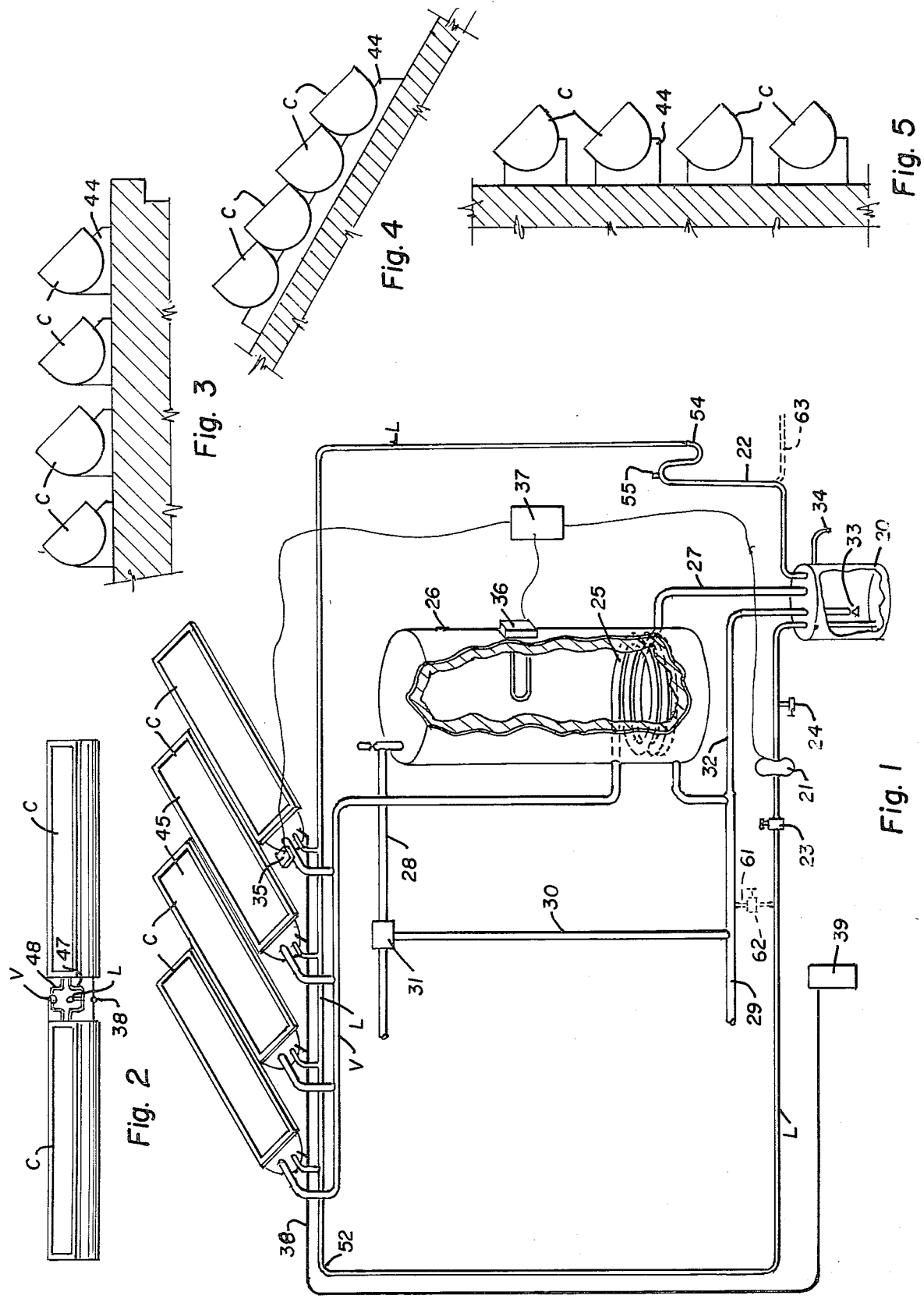

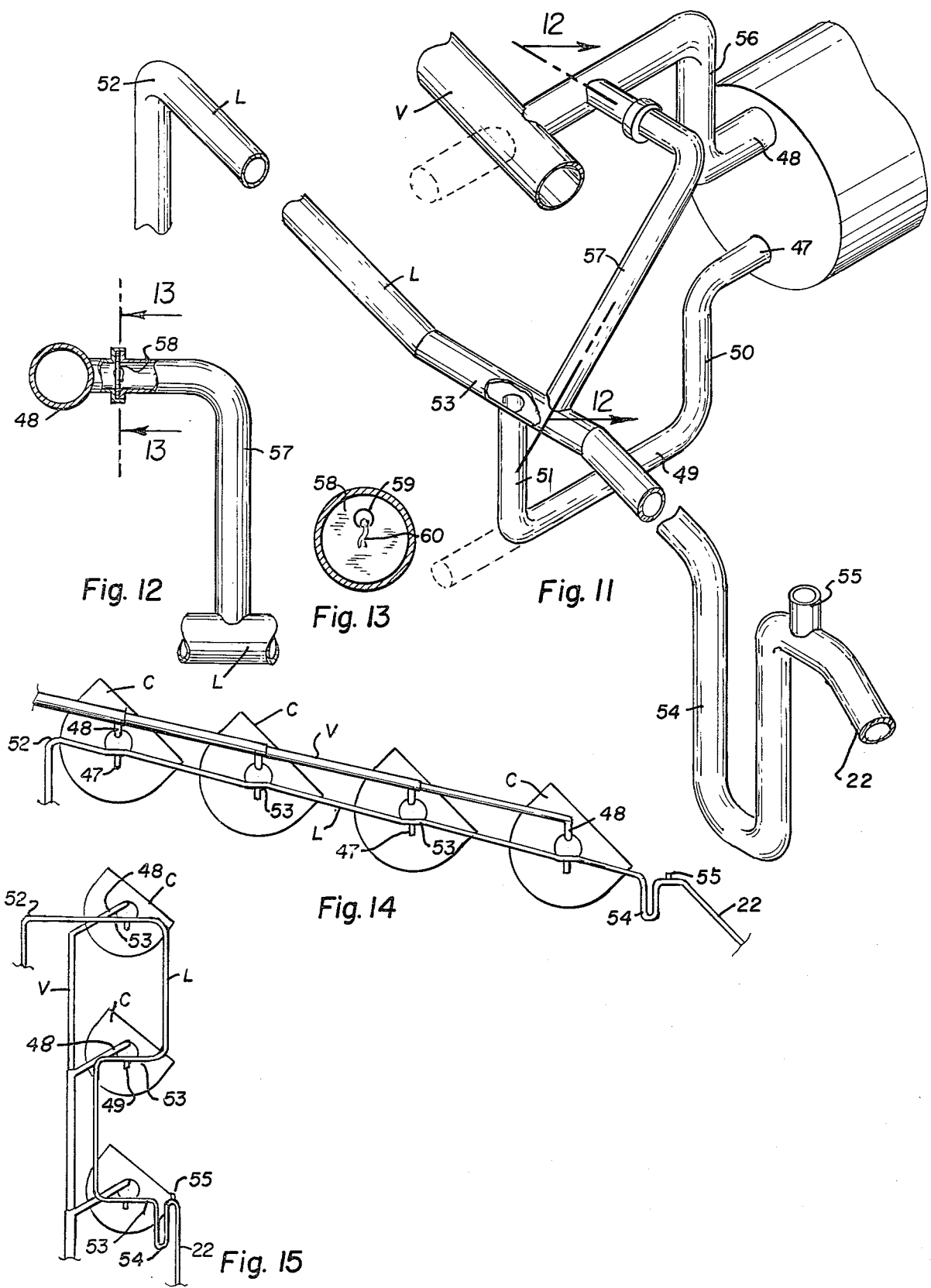

APPARATUS FOR COLLECTING AND TRANSPORTING HEAT ENERGY

The present invention relates to the collection and transfer of thermal energy, and more particularly to collectors of solar energy which reflect and concentrate the sun's rays against a heat absorption device such as a heat pipe.

The present invention is a development from and an improvement over U.S. Pat. No. 3,875,926 issued Apr. 8, 1975 to Matthew William Frank, co-inventor in the present application. That patent discloses a solar energy collection system wherein the collector reflects concentrated solar energy against a section of a conduit similar to a heat pipe, with the lower end of the conduit being submerged in a fluid source, normally water, and with an internal wick to flow the fluid by capillary action to the pipe section being heated by the concentrated solar energy. The vapor generated in this heated section of the pipe flows through the pipe to the point of use such as at a condensor and heat exchanger arrangement.

It was contemplated that the primary use for that solar energy collection system was for lifting water from a supply bay to move the vapor above the bay as to a condensor. Such a system was proposed for applying solar heat to buildings such as houses, but it was found that significant modifications and rearrangements of the components would be desirable although the generic concept of externally supplying water to a heat pipe, heated by concentrated solar energy to vaporize the water and move the vapor to a point of use would not be changed. In the first place, a reservoir or bay was necessarily replaced by a water line to bring water to the section of pipe being heated since the water supply would normally be remote from the solar energy source. To meet the energy demand for different types and sizes of buildings, it was found undesirable to custom design each system but more expedient to provide a selected number of unit collector modules which could be combined into a common system. Such a system had to be versatile for it would be used on various types of buildings and structures. The system could be installed upon a flat roof, an inclined roof or even a vertical wall. It also follows that there is a need to devise and to develop improved and simplified piping systems for the water supply and vapor transport lines which can be used with any of these different arrangements of unit collector modules.

With the foregoing and other considerations in view, the present invention was conceived and developed and comprises, in essence, one or more unit collector modules arranged in conjunction with a water supply line and a vapor transport conduit from the unit collector modules. Each unit collector module, hereinafter referred to as "collector," provides for a heat absorption pipe which receives the concentrated solar energy as from a reflector. The heat absorption pipe has a diameter sufficient to provide a sump of water at its lower portion throughout the reach of the pipe. When heated, this water will evaporate into its upper portion of the pipe. Preferably, a circumferential capillary wick is located in this heat absorption pipe to lift the water as a thin film to the upper portion of the pipe. The water supply line includes a trap arrangement to maintain a proper water level in the lower portion of the horizontal heat absorption pipe, that is, in the sump. The vapor transport conduit connects with the upper portion of the heat absorption pipe of each collector in the system and extends to a suitable heat exchanger. The water supply line and the vapor transport conduit are strategically cross-connected to maintain a suitable pressure balance throughout the system to assure a proper continuous operation as will be exemplified in the detailed description hereinafter set forth.

It follows that an object of the present invention is to provide a novel and improved energy collection system wherein a plurality of collectors are integrated to function together in an effective, efficient manner to vaporize water provided from a supply line and to transport this vapor through a conduit to a point of use where the vapor is condensed and the latent heat of vaporization is recovered.

Another object of the invention is to provde in such an energy collection system, a simple, effective piping arrangement to supply a controlled flow of water to the collectors, at a rate and in such a manner as to replace water as it is vaporized.

Another object of the invention is to provide in such an energy collection system, a simple piping arrangement which includes a water supply line to the collectors and a vapor transport conduit which is capable of controlling the water and vapor movements through the system in a recirculating, regulated manner without disruption as by an occurrence of unbalanced pressures or the like.

Another object of the invention is to provide a novel and improved energy collection system which combines a plurality of unit collector modules to produce a system having any specified capacity.

Another object of the invention is a simple, reliable method of flushing deposited minerals and preventing scale in the vaporizer section of open heat pipes which are being supplied with fluids containing dissolved impurities.

Another object of the invention is to provide a novel and improved energy collection system having a combined plurality of unit collector modules which can be effectively mounted in several different ways as upon flat, sloping and vertical surfaces.

Other objects of the invention are to provide in such an energy collection system, arrangements and components which are effective, efficient, reliable, economical, rugged and durable.

With the foregoing and other objects in view, our present invention comprises certain constructions, combinations and arrangements of parts and elements as hereinafter described, defined in the appended claims, and illustrated in preferred embodiment by the accompanying drawing in which:

FIG. 1 is a diagrammatic view of a complete solar domestic water heating system incorporating therein a sequence of unit collector modules, a water supply line and a vapor transport conduit, all being illustrative of a typical arrangement for using the invention.

FIG. 2 is a diagrammatic view of a pair of unit collector modules arranged side by side with a common water supply line and vapor transport conduit between the two units.

FIG. 3 is a diagrammatic view illustrating four collectors in sequence upon a flat roof.

FIG. 4 is a diagrammatic view illustrating four collectors in sequence upon an inclined roof.

FIG. 5 is a diagrammatic view illustrating four collectors in sequence on a vertical wall.

FIG. 11 is a diagrammatic isometric view of portions of the water supply line, a short portion of the vapor transport conduit and connections from these lines to the heat absorption pipe of a collector and with dotted portions of the drawing indicating extensions of such connections which may be used when two collector modules are arranged side by side as shown at FIG. 2.

FIG. 12 is a view of a pressure equalization bypass, partly in section, as taken from the indicated line 12—12 at FIG. 11.

FIG. 13 is a transvers sectional view as taken from the indicated line 13—13 at FIG. 12 but on an enlarged scale.

FIG. 14 is a diagrammatic view of a sequence arrangement of collectors which may be used on a flat roof or on a sloping roof to illustrate more specifically, the course of the water supply line and the vapor transport conduit connecting with these collectors.

FIG. 15 is a diagrammatic view similar to FIG. 14 to illustrate a sequence arrangement of three collector units mounted on a vertical wall.

Figure 6:
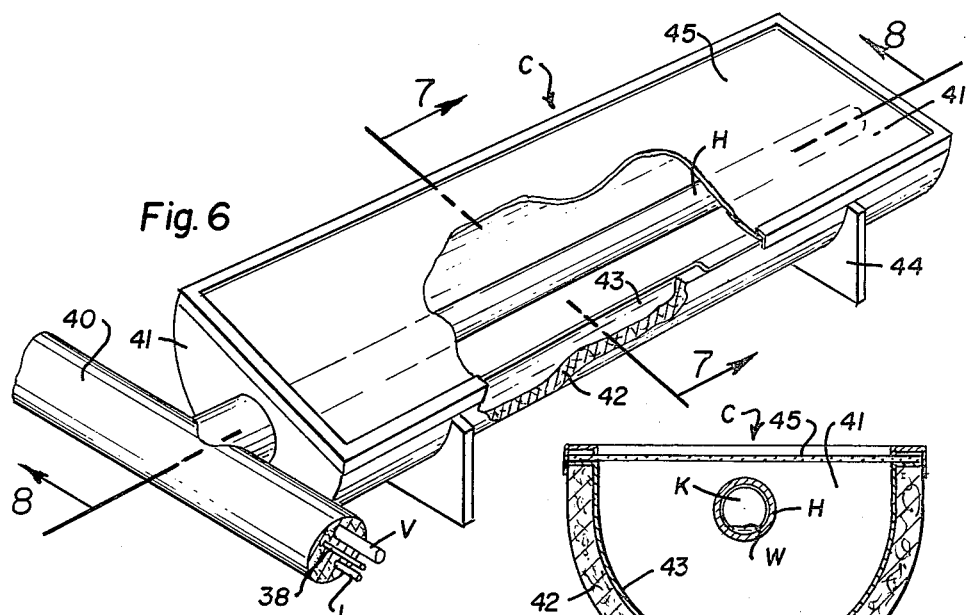
FIG. 6 is a perspective view of a unit collector and a fragment of an insulated pipe encasing the water supply lines and the vapor supply conduit to minimize heat losses, and with portions of the collector broken away to illustrate parts otherwise hidden from view.

Referring more particularly to the drawing, a system using the improved collectors C is diagrammatically illustrated at FIG. 1. Four collectors C are illustrated as being arranged in sequence. A water supply line L and a vapor transport conduit V connects with these collectors as hereinafter described. The collectors may be mounted upon various structures or supports and will ordinarily be mounted upon the roof or wall of a building. Thus, the collectors will be above the water supply source and water to the collectors C must be provided from a supply tank 20 through a pump 21 in the line L. The waterflow is continuous during operation and the line L includes a circulation return 22 to the tank 20. The quantity of water used by the collectors is not large and the flow will only partially fill the line L at the reach where the collectors tap the line as hereinafter described. Thus, the pump is preferably a constant volume type, such as a gear pump. If a centrifugal pump is used, it will be necessary to provide a regulating valve 23 in the line L to control the amount of water flowing through the line. Other features are provided in the line L such as a drain 24 to empty the lines if necessary. Also, manometers and vents and bypass lines regulate the air pressure in the line L especially where the water supply line L connects with the collectors as hereinafter described in detail.

The vapor transport conduit V extends from connections at the collectors C to a heat exchanger 25 which may be coils within a hot water storage tank 26. The vapor is condensed in the heat exchanger 25 where its' latent heat energy is released and a return line 27 returns the condensate produced by the condensed vapor to the supply tank 20. The heat storage tank 26 will normally be full of water which is heated by the heat exchanger 25. The hot water will be transported through a service line 28 to sinks, appliances or the like where the hot water is used. A replacement line 29 connecting with the bottom of the tank 26 will replace the transported water with fresh water, to the storage tank 26 as water is drawn from the tank 26 through the service line 28. A bypass line 30 may be provided between the hot water service line 28 and the replacement line 29 with a thermal mixing valve 31 at the junction with service line 28 and line 30 to limit the temperature of hot water flowing in the service line.

A supply line 32 is shown as being connected with the replacement line 29 to extend into the water supply tank 20 and a float valve control 33 to keep a minimum amount of water in the supply tank 20. An overflow 34 controls the maximum amount of water which will be in the supply tank 20 and also functions as an air vent.

A heat sensor 35 is placed at a collector C to restrict the operation of the pump to times when there is sufficient sunlight to start vaporizing the water in the collector. An electrical immersion heater and a thermostat 36 in the hot water storage tank may be also provided to allow backup heating of the hot water when there is not sufficient sunlight to meet the energy demand. Electrical leads from the heat sensor 35 are connected to a control box 37 which includes suitable relays and other components to operate the pump 21 and permit flow from the storage tank 20.

An air vent line 38 is connected to the several collectors to prevent a buildup of air pressure within the optical cavity of these units, since the air volume will vary as the collectors are heated and cooled. A filter 39 is placed at the end of this line to keep moisture and dust out of the interior of the modular units.

It is to be understood that the system, shown at FIG. 1 and the components of the system hereinabove described, is illustrative of one preferred arrangement to connect with a group of solar energy collectors C and that other arrangements are possible using similar components to those described.

As illustrative of another system configuration, the water supply from line L would be provided directly from an area water main and, diverted to the line L, as at bypass 61 which includes a flow regulator 62. In this case, the water main pressure lifts the water to the collectors. The water pump 21, controller 37, thermostat 35, flow regulator 23, drain 24, float valve 33 and make up water line 32 are then unnecessary and line 22 terminates at a drain line 63. The total solar system then operates with no need for electrical power or electrical devices and provides a small quantity of distilled water to the tank 60 as a byproduct of system operation. This distilled water can be removed from holding tank 20 and used for other purposes.

The basic structure which incorporates the present invention will include the water supply line L and a pump 21 (or main supply 61) to provide a measured flow of water through the line to and past the collectors C. The basic structure will also include the vapor transport conduit V which is connected with the collectors to extend to a heat exchanger or any other device making use of the vapor.

A group of unit collectors C may be mounted upon a roof, wall or other structure in a number of different ways, providing however, that each is essentially horizontal as hereinafter set forth. The mounting will, of course, be otherwise oriented so that they will receive a maximum exposure to sunlight.

FIG. 2 illustrates one method of mounting two collectors C in a side by side alignment with the water circulating line L, the vapor transport conduit V and the air vent 38 being placed between the collectors. It is to be noted that this side by side arrangement may be further extended by joining additional collectors together, end to end. This is not shown because the connecting of one collector with another is essentially the same as increasing the overall length of a collector. The collectors C may be mounted in a parallel sequence upon a flat roof, a sloping roof or even a vertical wall as diagrammatically illustrated at FIGS. 3, 4 and 5. In each instance, it is to be noted that each collector will be inclined at a selected, optimum position to best receive the sun's rays, for as long a period during the day as possible. The different modes of mounting and aligning solar energy collectors is well known to the art and need not be discussed further.

Figure 7:
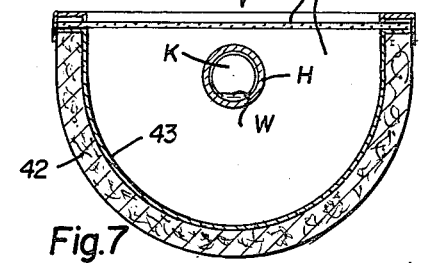
FIG. 7 is a transverse section of the collector as taken from the indicated line 7—7 at FIG. 6.
Figure 8:
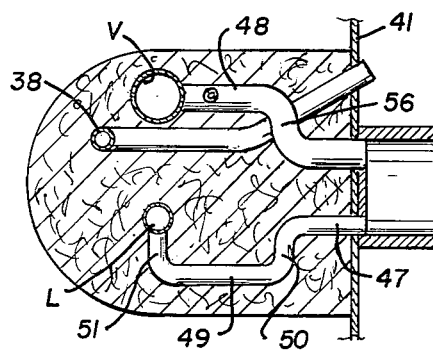
FIG. 8 is a longitudinal section of the heat absorption pipe in the collector and the connections to the water supply line and vapor transport line, as taken from the indicated line 8—8 at FIG. 6 but on an enlarged scale and with portions of the heat absorption pipe broken away to conserve space.

The general construction of a collector C is illustrated at FIGS. 6 and 7 and it is to be noted that the water supply line L and the vapor transport conduit V will be located comparatively close to an end of the collector C and preferably, the same end. For efficient heat transport and freeze protection, both the line L and conduit V and their leads to the collector will be encased in an insulating pipe 40 having a diameter sufficient to prevent any significant heat loss. The air vent 38 may also be enclosed in this pipe 40.

The collector itself is an elongated rectangular box, built in the general form of a half cylinder, with a glass covered opening, closed ends 41 and a longitudinally extended cylindrical undersurface 42. This undersurface 42 is formed as an outer insulation layer to minimize heat losses within the collector. The inside of this undersurface is a cylindrical reflector 43 to focus the solar energy against a longitudinally extended heat absorption pipe H within the collector. Such a reflector may be parabolic in form and the heat absorption pipe H may be at the focal point thereof. Practically, however, the reflector may be circular in form and regardless of the form, the focal point will shift from one position to another as the sun changes its position. Thus, to effectively receive and absorb all of the sun's rays from the reflector regardless of shifting of the focal point, the heat absorption pipe H is comparatively large in diameter and if necessary, longitudinal fins may be mounted on the heat absorption pipe in such a manner as to most effectively intercept all of the sun's rays falling into the collector and reflected from the mirror regardless of the sun's position. Various systems have been designed for this purpose and thus, the arrangement need not be described further in detail. In fact, it is to be noted that the invention herein disclosed can be effectively used with other sources of heat than solar energy. What is essential insofar as the present invention is concerned, is the provision of radiant or thermal energy to heat the heat absorption pipe H to produce a temperature sufficient to vaporize water, or any other selected fluid within the absorption pipe H.

To complete the collector C, suitable brackets 44 are provided at the outer portion of the body to permit it to be mounted in any manner desired and the top opening of the box will be closed by one, or preferably, two layers of glass or plastic 45 to prevent heat loss by exterior currents of air striking the absorption heat pipe H.

Figure 9:
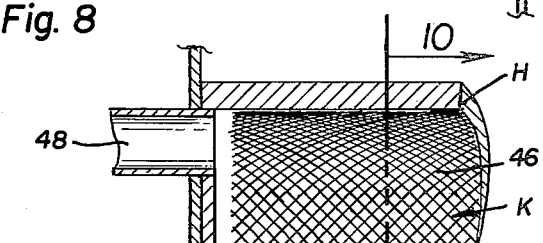
FIG. 9 is a sectional view similar to portions shown at FIG. 8 but on a further enlarged scale to more clearly illustrate structural details.
Figure 10:
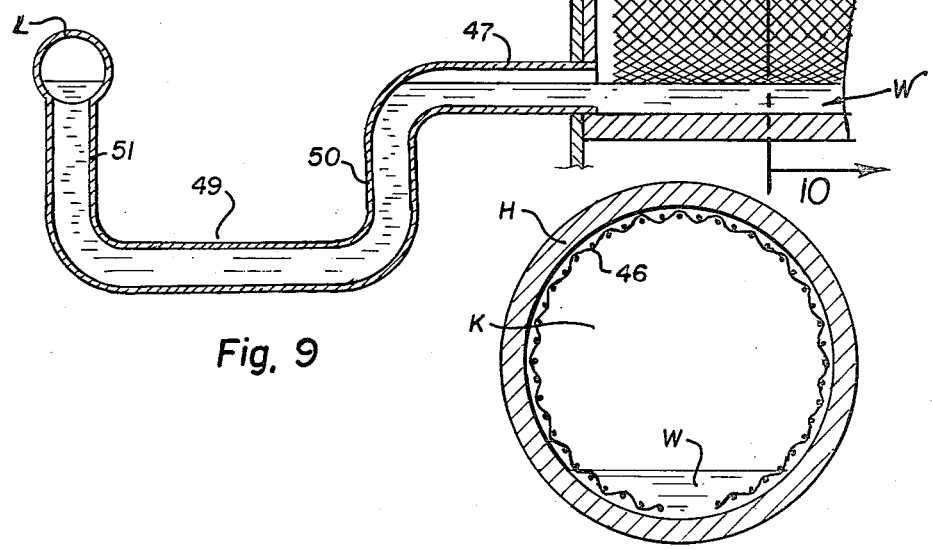
FIG. 10 is a transverse sectional detail as taken from the indicated line 10—10 at FIG. 9.

The horizontally disposed heat absorption pipe H has a sufficient external diameter, or is otherwise proportioned to intercept the sun's rays entering the collector as mentioned. The heat absorption pipe has an internal diameter sufficient to provide for an elongated puddle of water W in the lower sump portion of the pipe H and an elongated vaporizing chamber K in the upper portion of the pipe as best shown at FIGS. 9 and 10. This diameter should be large enough to permit small errors in leveling which may occur when a collector is installed on a roof or a wall. If not level, or nearly so, the puddle of water W will not be at one end of the pipe and the other end will be filled with water.

For a collector having a length of approximately four feet, the inside diameter of the heat absorption pipe H is preferably in the range of one to two inches. When the collector operates, the reflector will heat the pipe H to a temperature sufficient to vaporize the water in the lower portion of the pipe. Preferably, a wick 46 of a suitable synthetic or natural fiber may be fitted into the heat absorption pipe H to lift water by capillary action to the surface of the pipe at the vaporizing section K above the puddle W. The wick 46 may be formed as a flat strip formed as tubular member which extends into the pipe H to engage the inner walls thereof.

As illustrated, a water inlet tube 47 and a vapor outlet tube 48 are provided at one end of the pipe H. The water inlet tube connects at the bottom of the pipe H where the puddle W forms and the vapor outlet tube 48 connects at the top of the pipe H in the chamber K. Both tubes at one end of the pipe H is the preferred arrangement but it is to be understood that the water inlet tube 47 could be at one end of the pipe H and the vapor outlet tube 48 at the opposite end without changing the operation of the collector. Water must flow into the pipe H to replace water as evaporation occurs and to keep the elongated puddle W full. For collectors of normal proportions this water flow is small and may be in the range of one to five liters per hour during the day, but it will be even less in the morning and evening of a day.

To provide a reliable infeed for this small varying demand of water, a continuous flow of water is maintained in the supply line L and whatever is needed by the pipe H will flow into the inlet tube 47. The remainder of the flow in the supply line L, will continue to the next collector, or collectors, in line and thence to the return 22 (or to drain line 58). This flow through the inlet tube 47 and into the pipe H is basically, a simple gravity flow. To accomplish this, the supply line L at the collector, where the connection with tube 47 is located, is at the level of the puddle W and the capacity of the pump 21 (or flow regulator 62) is such that there is only sufficient water flowing through the supply line L to keep it about half full. For an effective, disturbance-free flow communication between the supply line L and the pipe H, and to prevent vapor flow out of pipe H to supply line L, the water inlet tube includes a trap 49, an inverted siphon, having a downturn 50 connecting with the water inlet tube 47 and a riser 51 connecting with the bottom of the supply line L.

The flow in the water supply line L will normally be in the nature of an open channel flow, that is, with a free surface in the upper portion of this line as mentioned. For the quantities of water involved, it was found that the diameter of the pipe could be ½ to ¾ inches for most installations to permit the desired open channel flow and to supply water to the puddle W in the pipe H of each collector. In this manner the water level at each trap 49 adjacent to a collector C is always properly controlled.

It follows that the reach of the water supply L past the collectors must be downsloped and the reach will commence at a high point 52, where the flow starts. The slope of the supply line L will necessarily correspond to the arrangement of the collectors on a roof, and whenever these collectors are set upon a flat roof, it is contemplated that they will be arranged with a small slope, as by adjusting the collector mounts 44. Thus, the first collector to be serviced will be higher than the others. Even though the slope of the line L between the collectors will be comparatively small, and nearly flat, the desired open-channel type of flow in the reach of line L is easy to maintain. Where the collectors are set upon an inclined roof, the slope will be much steeper, but it was found that the system would work just as well and the open channel type of flow in the line L could be easily maintained. This sloping line L is shown at FIGS. 14 and 15. If desired, the portion of the line L approaching a collector may level off as at 53, then continue at a steeper slope a short distance beyond the trap 49 connecting with the collector. Finally, after the line L passes the last collector, it will constitute the return 22 and extend to the supply tank 20. There will be provided somewhere in the return reach 22 a trap 54, or manometer, with a vent 55 at the downstream side of the trap to provide for any pressure or vacuum release in the downstream side of the manometer 54 and especially to prevent any siphoning of the liquid out of the manometer. The manometer 54 is placed in the line in order that the liquid may freely flow through the line but the air also in line 53 will be trapped. This trapped air in line 53 is used to slightly pressure the water supply in the line in order to prevent the operating vapor pressure in pipe H from depressing the level of puddle W. The manometer can be located anywhere in the line and ordinarily, it will be placed inside the building where the chance for freezing of water in the trap is minimized.

The vapor outlet tube 48 from the top of the heat pipe may turn upwardly as a riser 56 to connect with the vapor transport conduit V, with the use of the riser 56 depending upon the location of the outlet tube 48 with respect to transport conduit V.

It is desired that a pressure balance be maintained between the water supply line and the vapor transport conduit V. This pressure balance is needed when the system starts up and air is exhausted from the vapor line and during operation of the system to prevent any positive vapor pressure in pipe H from depressing the level of puddle W. Accordingly, a pressure equalization bypass line 57 is connected to the vapor tube 58 and to the top of the water supply line L at one or more points in the system.

This bypass line drops from the vapor tube 48 above the water line L and it is desirable to keep this line full of air rather than having vapor flow into the upper position of the water supply line L. A restrictive diaphragm 58 may be located in the bypass line adjacent to the connection with the vapor outlet tube. There is a small orifice 59 in this diaphragm to minimize the flow therethrough, and yet provide for balanced pressures in the several lines. Since the environment will be water vapor, where some condensation can occur, it was undesirable to permit drops of water to seal off this orifice and such can be accomplished by a simple fiber wick or thread 60 in the orifice as illustrated.

Operation of the system is simple and essentially automatic. To initiate operation, as in the morning, there is no water in the supply line L except possibly at the traps 49 and 54. The vapor transport line is full of air. As soon as the sun commences to heat the absorption pipe H, the sensor 35 initiates flow of water through the water supply line L to maintain water puddles W in the sump portion of the pipe H. As vapor is generated, air is discharged from the vapor transport line, except where it is trapped for thermal isolation purposes, such as in the pressure equalization bypass 57. As the vapor enters the heat exchanger it is condensed to water, releasing its latent heat of vaporization. The condensate returns through line 27, to the supply tank 20. As water is heated in the storage tank 26, it may be used for various purposes. The entire system is balanced at all times with a maximum efficiency of operation.

In applications in which the water supply is provided by area mains, the concentration of dissolved solids will be increased in the collector heat absorption pipes H as the water is vaporized. If some means is not provided to remove these dissolved solids, the concentration will increase until they precipitate to form scale in the pipe H, to reduce the thermal efficiency of the collector and eventually block the flow of water into the pipe H. The water in the heat absorption pipe H can be periodically flushed to remove the dissolved solids. However, a more simple procedure is possible by permitting a continuous flow of water through the line L both during operating and non-operating periods. Then there is at all times a direct coupling of the water supply in line L and the water puddle in the heat absorption pipe, as through the water inlet tube 47. Since most solubles in water form mutually repellant ions, the higher concentration of solubles in the heat absorption pipe will hasten the diffusion of the solubles out of the heat pipe and into flowing water in the supply line L.

We have now described our invention in considerable detail. However, it is obvious that others skilled in the art can build and devise alternate and equivalent constructions which are nevertheless within the spirit and scope of our invention. Hence we desire that our protection be limited not by the constructions illustrated and described, but only by the proper scope of the appended claims.

What is claimed is:

1. An apparatus for collecting and transporting thermal energy as the vapor of a selected fluid, from a heat source having an intensity sufficient to vaporize the fluid, and to a location where condensation will occur, and comprising:
    (a) an elongated heat absorption chamber exposed to the heat source and positioned substantially horizontally to provide an elongated lower portion within the chamber constituting a sump to hold a puddle of said fluid and an elongated upper portion above the puddle constituting a vapor space;
    (b) a vapor transport conduit extended from the chamber above the puddle and to said location; and
    (c) a fluid inflow means adapted to supply fluid to the puddle and maintain the level of the puddle as fluid therein evaporates when the chamber is heated; wherein said fluid inflow means includes:

(d) a fluid supply line adjacent to the chamber and means to partially fill the fluid supply line to a substantially constant free surface fluid level which is essentially the same as the fluid level of the puddle;
(e) a conduit connecting the supply line and the sump which is below the said fluid levels to form a trap to provide continuous communication of fluid from the supply line to the puddle;
(f) a means to balance the pressures in the chamber and in the fluid supply line to maintain the aforesaid same fluid levels in the chambers and in the supply line; and
(g) the source end of the fluid supply line being above the heat absorption chamber to permit a continuous flow of fluid to be supplied from a high point in the line and to flow past the chamber.

2. The apparatus defined in claim 1 including a wick means at the interior walls of the heat absorption chamber to lift a film of fluid above the puddle and to the upper portion of the chamber.

3. The apparatus unit defined in claim 6, including further, a second such apparatus unit adjacent to the first with said fluid supply line and vapor transport conduit being connected with both units and with the units positioned side by side, with one higher than the other with the fluid supply line extending from one to the other and with the source end of the fluid supply line being above both to permit a continuous flow of fluid to be supplied from a high point in the line and to flow past both units.

4. An apparatus for collecting and transporting thermal energy as the vapor of a selected fluid, from a heat source having an intensity sufficient to vaporize the fluid, and to a location where condensation will occur, and comprising:
(a) an elongated heat absorption chamber exposed to the heat source and positioned substantially horizontally to provide an elongated lower portion within the chamber constituting a sump to hold a puddle of said fluid and an elongated upper portion above the puddle constituting a vapor space;
(b) a vapor transport conduit extended from the chamber above the puddle and to said location; and
(c) a fluid inflow means adapted to supply fluid to the puddle and maintain the level of the puddle as fluid therein evaporates when the chamber is heated;
(d) wherein said heat absorption chamber is an elongated heat absorption pipe with the lower portion constituting a sump wherein the puddle is formed and wherein said fluid inflow means includes:
(e) a fluid supply line extended alongside the heat absorption pipe, and a means to supply fluid thereto at a rate which only partially fills the line and provides a free surface of fluid therein and with the level of the free surface being essentially at the level of the puddle within the heat absorption pipe;
(f) a connecting conduit, connecting the fluid supply line and the sump, which is below said fluid levels to provide continuous communication of fluid and to provide a trap for preventing vapor generated in the chamber from flowing through the connecting conduit and into the fluid supply line;
(g) the source end of the fluid supply line being above the heat absorption chamber to permit a continuous flow of fluid to be supplied from a high point in the line and to flow past the chamber; and
(h) a bypass between the vapor transport conduit and the upper portion of the fluid supply line adjacent to the heat absorption pipe to maintain a balance of pressure in the fluid line and heat absorption pipe to prevent fluctuation of the water level of said puddle within the pipe.

5. The apparatus defined in claim 4 wherein said fluid supply line is a closed line alongside the heat absorption pipe, and wherein said bypass includes:
a restrictive orifice in the bypass to limit the flow of vapor from the vapor transport conduit and to the fluid supply line.

6. The apparatus defined in claim 4, including a solar collector having an elongated reflective condenser surface to concentrate solar rays to an approximate focal line in the collector with said heat absorption pipe being positioned at this focal line.

7. The apparatus as defined in claim 4 including a wick means at the interior walls of the heat absorption chamber to lift a film of fluid above the puddle and to the upper portion of the chamber.

8. An apparatus for collecting and transporting thermal energy as water vapor, from a heat source having an intensity sufficient to vaporize the water, and to a location where condensation will occur, and comprising:
(a) an elongated heat absorption pipe exposed to the heat source, positioned essentially horizontally to provide an elongated sump in the lower portion of the pipe to hold a puddle of water and an elongated vapor chamber in the upper portion of the pipe;
(b) a vapor transport conduit extended from the vapor chamber to said location;
(c) a water supply means including a supply conduit adjacent to the heat pipe, and a flow control means adapted to keep the supply conduit only partially filled to provide a free surface of water therein; and with the supply conduit being positioned with respect to the heat pipe such that the free surface water level is essentially the same as the puddle water level in said sump;
(d) a connecting conduit connecting the supply conduit and sump, which is extended below said water levels to provide continuous communication of water from the supply conduit to the sump;
(e) a pressure equalizing line connecting the upper portion of the supply conduit, above the water surface therein, with the vapor space above the puddle, which is formed by the said vapor chamber and the vapor transport conduit adjacent to the heat absorption pipe, whereby to balance the pressures of the supply conduit and the heat absorption pipe and maintain said water levels; and
(f) the source end of the fluid supply line being above the heat absorption chamber to permit a continuous flow of fluid to be supplied from a high point in the line and to flow past the chamber.

9. The apparatus defined in claim 8 including a wick means in the heat absorption pipe.

10. The apparatus defined in claim 8 including a vent means in the vapor transport conduit adapted to connect the vapor transport conduit to the atmosphere to maintain the pressure in the vapor transport conduit at or slightly above atmospheric pressure when the apparatus is operating and at atmospheric pressure when vapor is not being generated.

11. The apparatus defined in claim 10 wherein a condenser in the vapor transport conduit is at said location and the vent means is in the vapor transport conduit beyond the condenser.

12. The apparatus defined in claim 11 wherein the vent means is at the end of the vapor transport conduit.

13. The apparatus defined in claim 10 wherein the vapor transport conduit terminates at a water holding tank and the vent means includes an air vent in the holding tank.

* * * * *